Floyd E. Bigelow, Jr.
INVENTOR.

BY Charles E. Lightfoot
ATTORNEY

Floyd E. Bigelow, Jr.
INVENTOR.

BY Charles E. Lightfoot
ATTORNEY

Floyd E. Bigelow, Jr.
INVENTOR.

BY Charles E. Lightfoot
ATTORNEY

Floyd E. Bigelow, Jr.
INVENTOR.

BY Charles E. Lightfoot
ATTORNEY

United States Patent Office

Re. 25,827
Reissued Aug. 3, 1965

25,827

PORTABLE BUILDING AND APPARATUS FOR THE TRANSPORTATION AND ERECTION OF THE SAME

Floyd E. Bigelow, Jr., 6614 Lindyann, Houston, Tex.

Original No. 3,095,616, dated July 2, 1963, Ser. No. 26,234, May 2, 1960. Application for reissue Sept. 16, 1963, Ser. No. 309,362
6 Claims. (Cl. 52—122)

Matter enclosed in heavy brackets [ ] appears in the original patent but forms no part of this reissue specification; matter printed in italics indicates the additions made by reissue.

This invention relates to portable buildings and more particularly to buildings of the folding type and apparatus for facilitating the transportation and erection of such buildings.

The invention has for an important object the provision of apparatus for use with portable buildings of the folding type to enable such buildings to be readily stacked one upon another in their dismantled or folded condition, which may serve as a base or foundation for such a building when the same is erected and which also has means for facilitating the erection of the building.

Another object of the invention is to provide a skid or foundation frame for portable buildings, which is constructed to permit such buildings in folded condition to be stacked one above another and including means for holding the buildings out of load transmitting relation when stacked.

A further object of the invention is the provision of a skid or foundation frame for portable buildings embodying means which may be used to securely anchor the building to the frame either in its erected or folded condition thereon.

Another object of the invention is to provide a skid or foundation structure for portable buildings of the folding type, which is constructed to permit the frames to be slideably moved into stacked arrangement while holding the buildings out of load transmitting engagement.

A further object of the invention is the provision of a supporting foundation and transporting frame for portable buildings of the folding type which is equipped with hoisting mechanism to facilitate the erection and dismantling of the building.

Another object of the invention is the provision of a foldable building having side walls which may be detached and folded into superposed relation upon the floor of the building to form a compact arrangement for easy transportation and having sealing means positioned for coaction with the walls at the corners of the building and with the walls and floor when the building is erected to form a tightly sealed structure.

A further object of the invention is to provide a foldable building having side walls which may be erected with their side edge portions in interfitting relation to form a rectangular structure and also having an inverted tray shaped roof whose sides are adapted to be positioned externally of and extending downwardly along the upper margins of the walls and also having means for anchoring the roof in place when positioned on the walls.

A still further object of the invention is to provide a combined foundation and transportation frame for portable buildings of the foldable type, which is of simple design and rugged construction, capable of withstanding the extreme condition of exposure and hard usage to which structures of this kind are likely to be subjected.

The above and other important objects and advantages of the invention may best be understood from the following detailed description, constituting a specification of the same, when considered in conjunction with the annexed drawings, wherein FIGURE 1 is a perspective view illustrating a preferred embodiment of the invention showing the building in erected condition;

Figure 9:
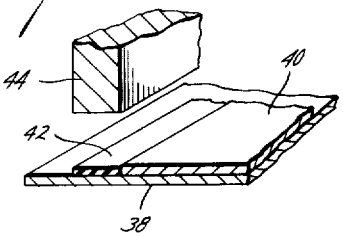
FIGURE 9 is a fragmentary, perspective view, on a somewhat enlarged scale showing a portion of the floor and one side wall of the building and the seal forming means positioned to form a seal between these parts.
Figure 10:
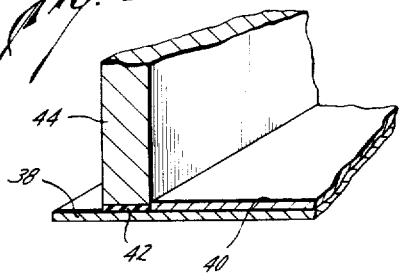
Figure 11:
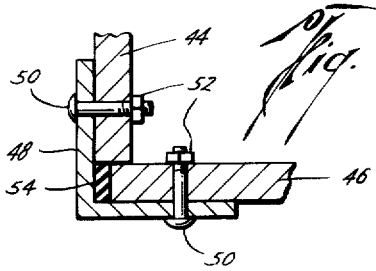

FIGURE 10 is a view similar to that of FIGURE 9 showing the manner in which the floor and wall coact with the sealing means when the building is erected; and FIGURE 11 is a fragmentary plan view, on a somewhat enlarged scale, showing a corner of the building with the sealing means positioned therein and the manner in which the walls coact at the corner of the building to form a tightly sealed structure.

Referring now to the drawings in greater detail, the invention is disclosed herein in connection with a portable building of the type having side walls constructed to be disconnected positioned in superposed relation on the floor of the building, and a roof of inverted tray shape which is adapted to be placed over the walls and floor to form a unitary package which may be conveniently transported. The floor of the building is mounted upon a base frame formed with skids to support the building on the ground and to permit several such buildings to be stacked one upon another in their folded condition. The supporting frames being constructed for engagement when stacked to carry the load of the buildings and to maintain the buildings out of load carrying engagement with each other.

Figure 5:
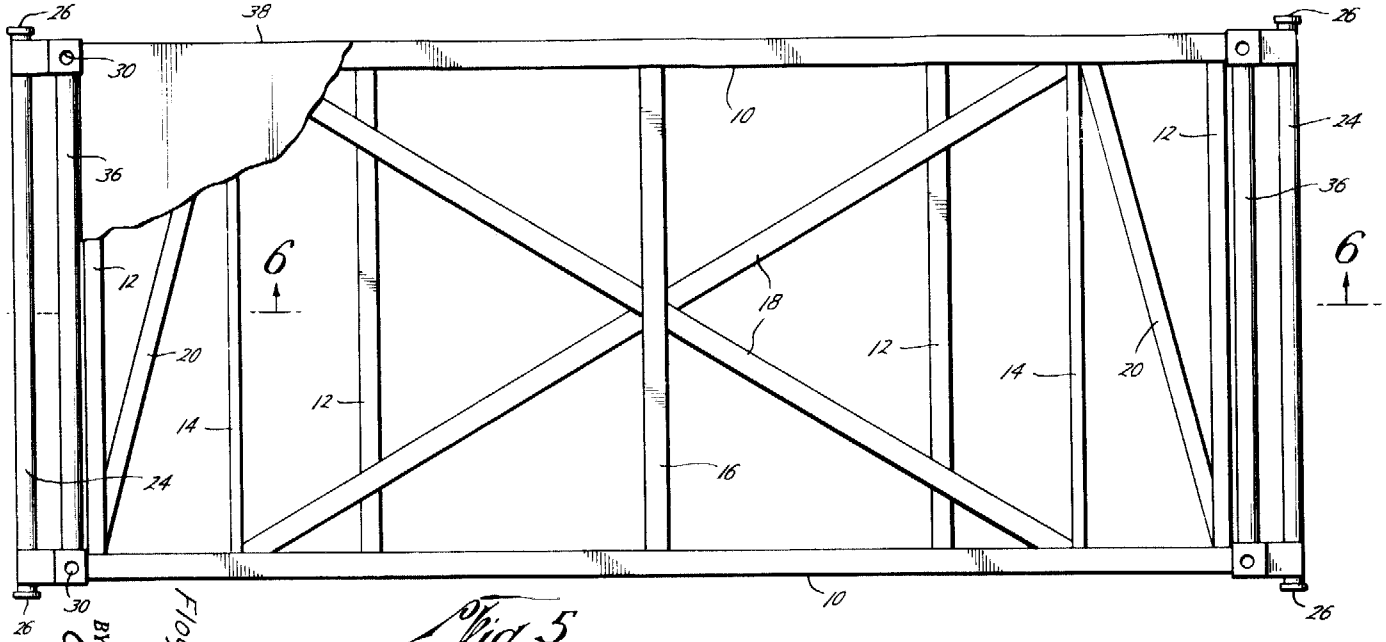
FIGURE 5 is a top plan view of the invention.
Figure 6:
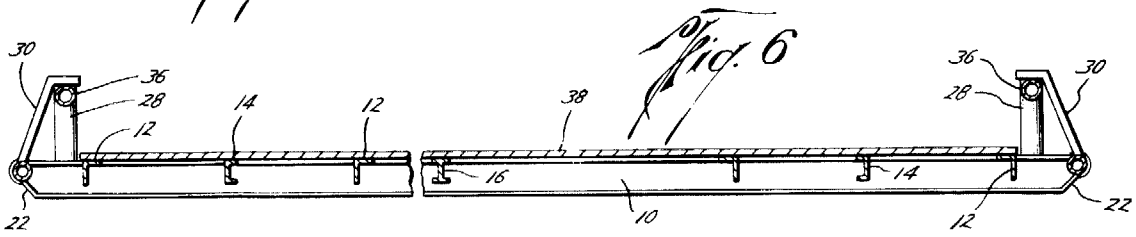
FIGURE 6 is a cross-sectional view, on a slightly reduced scale, taken along the line 6—6 of FIGURE 5, looking in the direction indicated by the arrows.
Figure 8:
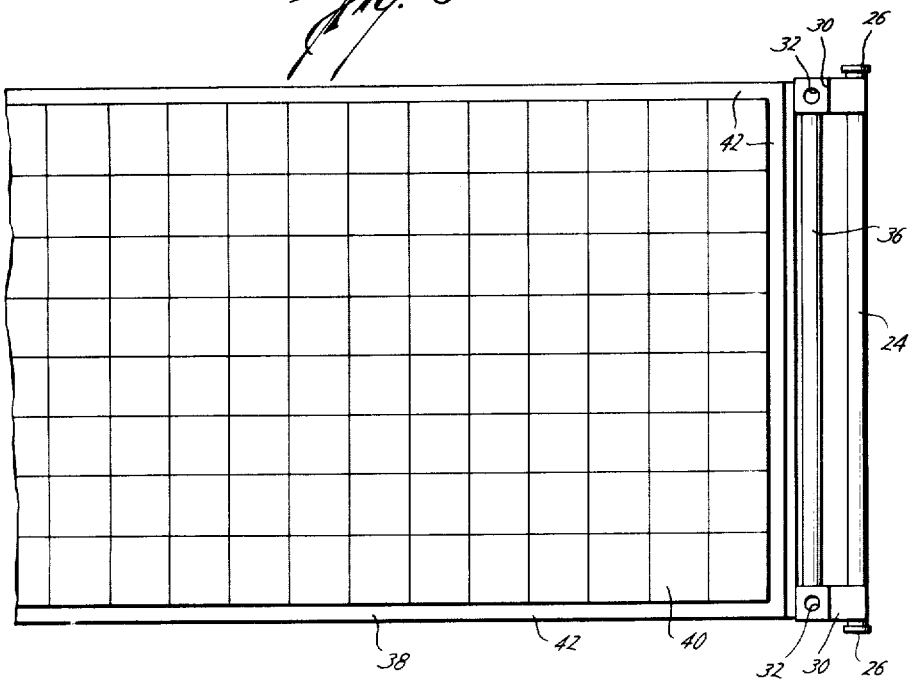
FIGURE 8 is a fragmentary plan view of the floor of the building with the side walls removed therefrom.

The supporting or foundation frame may be of generally rectangular shape, having side frame elements 10, which may take the form of I-beams forming ground engaging skids, the side frame elements being connected together by suitable cross members, such as those shown at 12, 14 and 16 of suitable shape in cross-section to form a rectangular frame, which may also be provided with suitable diagonal braces, such as those indicated at 18 and 20 in FIGURE 5.

At the ends of the frame, the lower flanges of the side elements 10 extend upwardly to form bevelled end portions 22 of the skids, which are for the purpose of aiding in the stacking of the buildings in a manner to be described in detail hereinafter. At the ends of the frame the side elements are connected together by means of tubular end members or pipes 24 which extend at their opposite ends beyond the sides of the frame, and whose ends are provided with flanges 26 to serve as retainers for hooks or links, of cable or chain mechanism by which the frame with the buildings thereon may be conveniently moved about. The frames are also provided near each corner with an upright tubular post 28, whose lower end is connected to the upper flange of one of the side elements, as by means of welding, or the like, and whose upper end is connected to one of the end members 24, by means of an upwardly extending strap 30, whose upper end extends over the upper end of the post and is provided with an opening 32 therethrough, through which a pole 34 of hoisting mechanism may be removably inserted to hold the same in an upright position for use in elevating the roof of the building in a manner to be hereinafter described. The posts 28 at each end of the frame may also be connected together by a cross bar 36 to brace the same.

The floor 38 of the building is positioned on top of the frame, and may conveniently be made up of one or more panels, such as panels of plywood, or the like, suitably attached to the frame and substantially covering the entire rectangular area of the frame between the posts 28 thereof. The area of the floor which lies within the side walls of the building when the building is erected may be provided with suitable floor covering, such as floor covering 40, such as linoleum, tile, or the like, which covering may be surrounded by a seal forming strip 42 formed of suitable sealing material, such as sponge rubber, or the like, upon which the lower edges of the wall of the building may rest when the walls are erected on the floor, to form a weather excluding seal.

The walls of the building may be of any desired construction, such as panels of plywood or spaced apart sheets of suitable material between which [installation] *insulation* may be placed, the building being preferably of a length and width to permit the end walls to be positioned flat on the floor and to enable the side walls to be placed flat in superposed relation on top of the end walls when the building is dismantled.

At the corners of the buildings, the side walls 44 and end walls 46 may be connected together by external upright corner elements 48, of angle shape in cross-section, as by means of bolts 50 provided with nuts 52, extending through the corner elements and the walls, as best seen in FIGURE 11, or by other suitable fastening means, whereby the walls may be readily disconnected when desired. The corner elements 48 may preferably carry a seal strip 54 of sponge rubber, or the like, which is positioned to be engaged by the vertical edges of the walls when the walls are connected together, to form a weather-tight seal.

The roof of the building is of inverted tray shape formed of suitable material, such as plywood panels or glass and of a size such that the sides 60 and ends 62 of the tray may extend downwardly externally over the upper edges of the side and end walls 44 and 46, to enclose the upper marginal portions of the walls and to hold the walls against outward movement when the building is erected. At the corners of the roof, the sides 60 and ends 62 of the tray are provided with an external connector angle 66, attached thereto, each of which is provided with an external connector element 68, of C shape to provide upwardly and downwardly directed hooks 70 and 72 respectively, to be used in lifting the roof in erecting the building and for the purpose of anchoring the roof to the supporting frame when the roof is in position over the upper margins of the walls.

Figure 1:
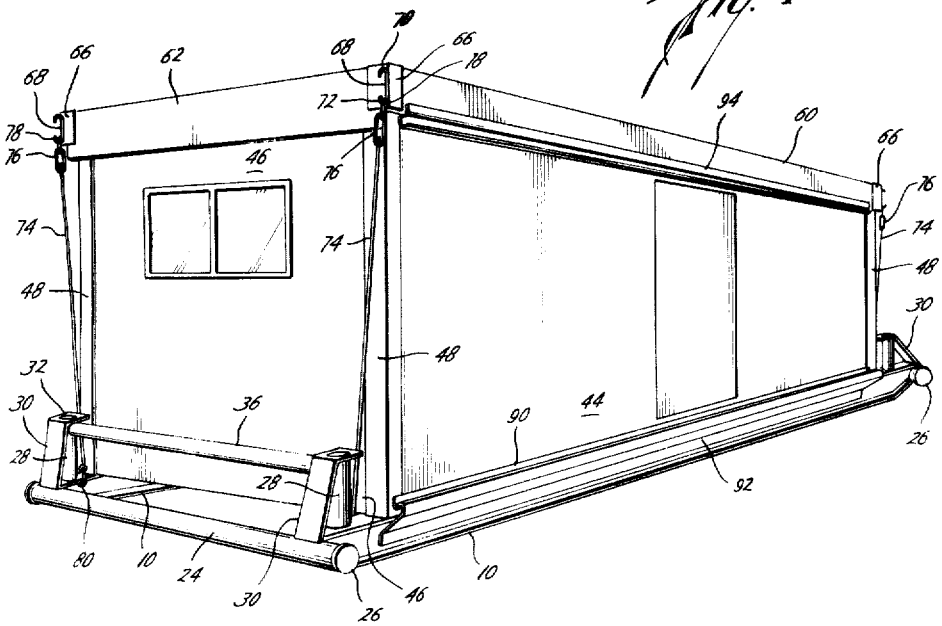

As seen in FIGURE 1, anchoring rods or cables 74 are provided at the corners of the building, which rods or cables are provided with suitable means, such as teeth buckles 76 by which the same may be tightened, the anchor rods being provided at their upper ends with eyes 78, through which the upwardly directed hooks 72 of the connector elements 68 may be extended, and having at their lower ends hook portions 80 adapted to be hooked beneath the upper flanges of the side frame elements 10 to releasably anchor the roof to the frame when the building is erected. It is to be noted that the anchor rods 74 are positioned at a slight angle to the vertical, so that they may serve as additional bracing means to hold the structure in a rectangular condition and prevent distortion of the building in the event that the supporting frame does not rest on the ground in an exactly horizontal position.

The hoisting mechanism by which the roof is elevated and held in a position to permit the erection of the walls on the floor comprises a pole 34 for each of the posts 28, each of which pole carries at its upper end a pulley or sheave 82, rotatably mounted thereon and over which a cable 84 may operate, the cable being provided at one end with a hook 86 engageable with the upper hook 70 of the connector element 68, and being attached at its other end to a winding drum 88 rotatably mounted on the pole at a suitable location to be easily reached by the operator when the pole is inserted in the post 28.

The winding drum may be provided with suitable ratchet mechanism, not shown, by which unwinding of the cable may be prevented to hold the roof at the desired elevation.

Each of the side walls 44 is provided exteriorly along its lower margin with an elongated connecting element 90, which is of U or J shape in cross-section and which may be formed of any suitable material, such as sheet metal. The connector element 90 preferably extends from end to end throughout the length of each side wall, the curved or hooked portion of the J opening upwardly and the element is attached to the side wall with the vertical arm of the J in contact with the outer face of the side wall, as by means of bolts or other suitable fastening means.

Figure 2:
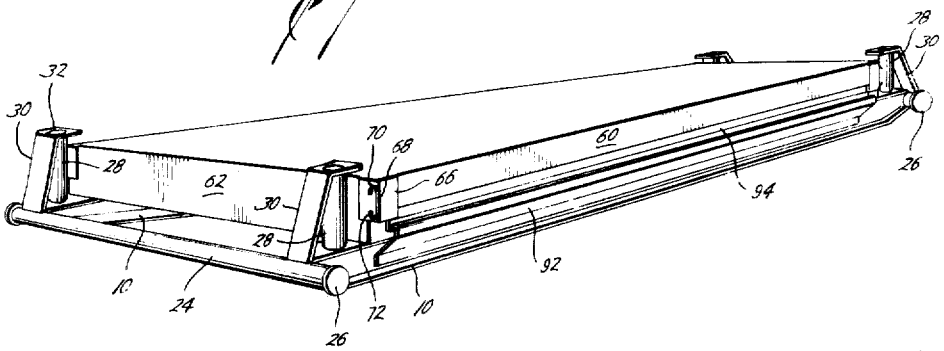
FIGURE 2 is a view similar to that of FIGURE 1 showing the skid or frame of the invention with the building in its folded conditon thereon.

An elongated connector element 92 is attached to the web of each of the side frame elements 30, as by means of welding and extends outwardly and upwardly from the web, and is formed with an inverted J shaped portion whose curved or hooked shaped portion is directly inwardly and downwardly in outwardly spaced relation to the side edge of the floor 38, as best seen in FIGURES 1 and 2.

An elongated connecting element 94 having a portion which is angle-shaped in cross-section is attached externally to the lower marginal portion of each side 60 of the roof, as by means of bolts, or the like, which connecting element preferably extends from end to end throughout the length of the side 60 and is formed with a downwardly extending upwardly opening portion of J shape in cross-section similar to the connecting element 90.

Figure 4:
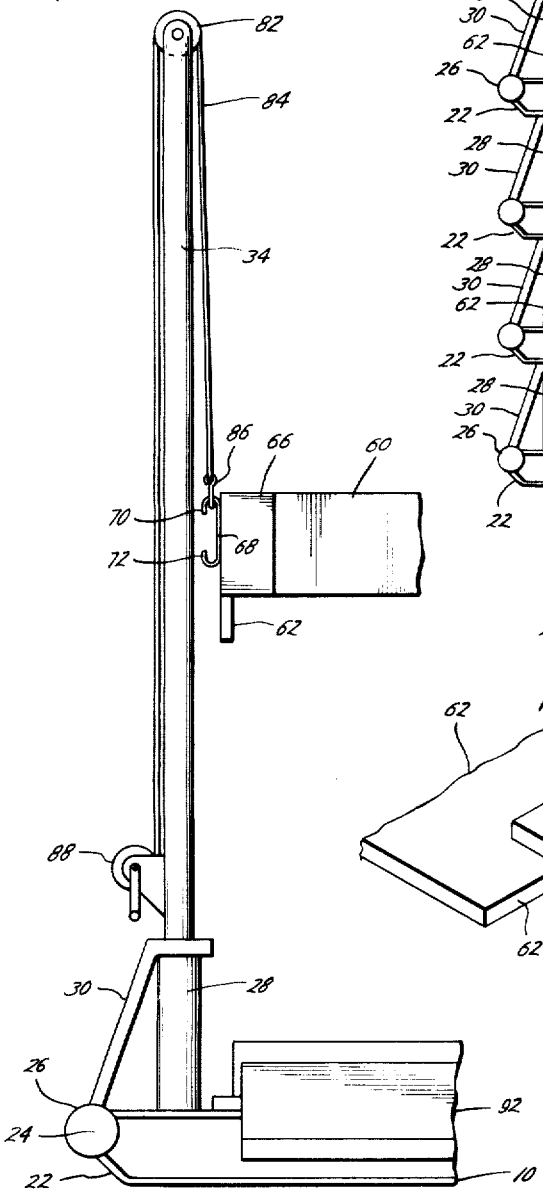
FIGURE 4 is a fragmentary, side elevational view on a somewhat enlarged scale showing details of structure of the invention, including the removable hoisting mechanism thereof and the manner in which such mechanism is applied and used.

In erecting the building, assuming that the building is in its dismantling and packaged condition, as illustrated in FIGURE 2, the poles or pipes 34 are inserted in the posts 28 at each corner of the frame the posts forming sockets by which the poles are held in upright positions, as shown in FIGURE 4. Hooks 86, attached to the cables 84, are then hooked into the downwardly directed hooks 70 on the corners of the roof, whereupon the winding mechanism of each of the poles may be operated to elevate the roof to a height to permit the walls to be erected on the floor. The side and end walls are then moved to upright positions with the lower edges of the walls resting upon the seal strip 42 and the side edges of the walls positioned in contact with the seal strips 54 within the corner members 48, as shown in FIGURE 12, whereupon the corner members may be bolted to the walls to hold the walls upright. With the walls thus erected, the roof may then be lowered over the upper margin of the walls, as illustrated in FIGURE 1, the sides 60 and 62 of the roof forming a skirt encompassing the walls. The braces 74 may then be connected to the upwardly directed hooks 72 on the corners of the roof and to the upper flanges of the side frame members 10 to hold the roof down on the walls.

In assembling the walls on the floor, the J elements 90 may be hooked into the J shaped portions of the elements 92 to securely hold the walls on the floor.

In dismantling the building, the braces 74 are released and the hoisting mechanism is applied, as previously described, to lift the roof off of the walls, whereupon the corner elements 48 may be unbolted from the walls and the walls laid down upon the floor, the J connector elements 90 and 92, when present being unhooked. With the walls thus arranged in superposed relation on the floor, the roof may then be lowered to engage the sides 62 of the skirt of the roof with the floor to enclose the walls between the roof and floor. When the roof is thus lowered onto the floor, the upwardly opening J portion of the roof connector elements 94 will move into interlocking engagement with the downwardly opening J portions of the connector elements 92 to hold the roof securely connected to the frame. If desired, the connector elements 94 may be removed prior to the lowering of the roof, to permit these elements to be interlockingly engaged with the connector elements 92, and the elements 94 may then be reconnected to the roof.

Figure 3:
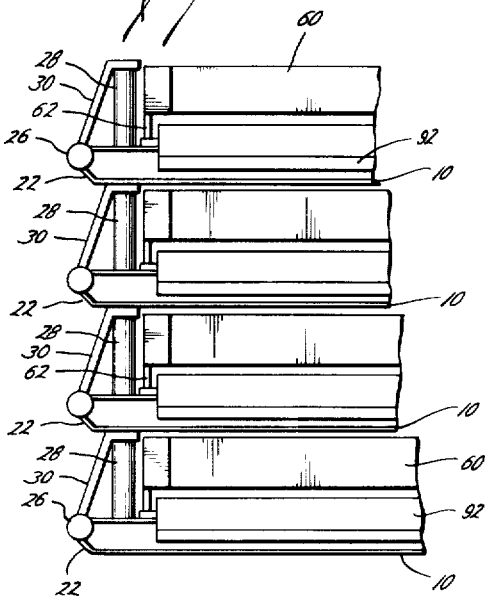
FIGURE 3 is a fragmentary, side elevational view showing a number of the devices of the invention arranged in stacked relation and the manner in which they coact to hold the buildings thereon out of load transmitting relation.
Figure 7:
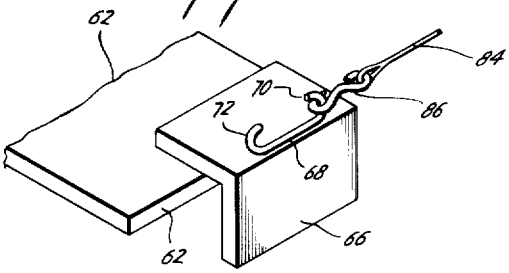
FIGURE 7 is a fragmentary perspective view, on a somewhat enlarged scale, showing the manner in which the hoisting mechanism of FIGURE 4 is connected to the roof of the building to lift the roof in erecting the building.

A number of the buildings in their folded condition, as illustrated in FIGURE 2, may if desired be stacked one upon another as illustrated in FIGURE 3, and to accomplish this, suitable means such as cables or chains may be connected to the cross-member 24 at one end of one building, whereupon this end of the building may be lifted to permit the skids 10 to engage the upwardly inclined end members 30, of another building so that said one building may be moved upwardly and longitudinally over the other building with the skids 10 supported on the posts 28 to hold the skids of one building out of contact with the roof of the next lower building in the stack. By this means, the weight of the buildings when stacked is borne by the supporting frames of the buildings to prevent crushing or other damage to the floors and roofs of the buildings during handling or transportation of the building.

It will thus be seen that the invention, constructed as described above, provides a portable building which is easily erected or dismantled, which is of rugged and weather resistant construction, and which is easily transported from place to place.

The invention is disclosed herein in connection with a certain specific construction and arrangement of parts, but it will be understood that this is intended by way of illustration only and that various modifications can be made in the structures of the parts and the manner in which they are assembled within the spirit of the invention and the scope of the appended claims.

Having thus clearly shown and described the invention, what is claimed as new and desired to secure by Letters Patent is:

1. In a portable building the combination with a floor, separate walls laid in superposed relation on the floor and a roof positioned over the walls, coacting with the floor and enclosing the walls, of a supporting frame upon which the floor is positioned and having upwardly and inwardly sloping end faces and horizontally extending portions extending inwardly from the upper ends of said faces above said roof in position for engagement with another such supporting frame to support the same above said roof.

2. In a portable building the combination with a floor, walls laid on the floor in superposed relation and a roof positioned over the walls, coacting with the floor and enclosing the walls, a rectangular supporting frame having side frame members extending beyond the floor at the ends of the building and formed with upwardly and outwardly sloping end faces, means on the frame forming upwardly and longitudinally inwardly sloping surfaces above said faces and whose upper ends extend above the roof in position for engagement with another such supporting frame to support the same above said roof and means forming upright sockets on the frame outwardly of the floor, and means for raising the roof above the floor including upright members whose lower ends are removably insertable in said sockets.

*3. A portable building comprising,*
*a base frame,*
*a floor secured to said frame,*
*a plurality of walls lying flat in superposed relationship on said floor,*
*a roof superposed above and covering said walls,*
*a plurality of upwardly extending posts on said frame spaced outside the periphery of said floor walls and roof and extending above said roof with the roof and walls lying flat in superposed relationship on said floor,*
*said posts adapted to engage another such base frame to support same above said roof,*
*said walls adapted to be erected to vertical position and to extend above the periphery of said floor and spaced inwardly from said posts,*
*and means for securing the walls together and to the frame, said roof shaped to be positioned over the upper edge of said erected walls.*

*4. A portable building comprising,*
*a base frame,*
*a floor secured to said frame,*
*a plurality of walls lying flat in superposed relationship on said floor,*
*a roof superposed above and covering said walls, said roof having a downwardly extending skirt surrounding said walls,*
*a plurality of upwardly extending posts on said frame spaced outside the periphery of said floor walls and roof and extending above said roof with the roof and walls lying flat in superposed relationship on said floor,*
*said posts adapted to engage another such base frame to support same above said roof,*
*said walls adapted to be erected to vertical position and to extend about the periphery of said floor and spaced inwardly from said posts,*
*and means for securing the walls together and to the frame, said roof shaped to be positioned over the upper edge of said erected walls with said skirt surrounding said erected walls.*

*5. A portable building comprising,*
*a base frame,*
*a floor secured to said frame,*
*a plurality of walls lying flat in superposed relationship on said floor,*
*a roof superposed above and covering said walls, said roof having a downwardly extending skirt surrounding said walls,*
*a plurality of upwardly extending posts on said frame spaced outside the periphery of said floor walls and roof and extending above said roof with the roof and walls lying flat in superposed relationship on said floor,*
*said posts adapted to engage another such base frame to support same above said roof,*
*said walls adapted to be erected to vertical position and to extend about the periphery of said floor and spaced inwardly from said posts,*
*means for securing the walls together and to the frame, said roof shaped to be positioned over the upper edge*

*of said erected walls with said skirt surrounding said erected walls,*

*means on said frame at each corner of said floor for attaching tension members and means on said roof on opposite ends thereof and spaced inboard of said means on said frame when the building is erected for attaching said tension members whereby a pair of tension members secured in tension at each end of the building will strengthen said building.*

*6. A portable building comprising,*

*a base frame,*

*a floor secured to said frame,*

*a plurality of walls lying flat in superposed relationship on said floor,*

*a roof superposed above and covering said walls, said roof having a downwardly extending skirt surrounding said walls,*

*a plurality of upwardly extending posts on said frame spaced outside the periphery of said floor walls and roof and extending above said roof with the roof and walls lying flat in surposed relationship on said floor,*

*said posts adapted to engage another such base frame to support same above said roof,*

*said walls adapted to be erected to vertical position and to extend about the periphery of said floor and spaced inwardly from said posts,*

*means for securing the walls together and to the frame, said roof shaped to be positioned over the upper edge of said erected walls with said skirt surrounding said erected walls,*

*said posts including means forming upright sockets,*

*and means for raising the roof above the floor including upright members whose lower ends are removably insertable in said sockets.*

References Cited by the Examiner

The following references, cited by the Examiner, are of record in the patented file of this patent or the original patent.

UNITED STATES PATENTS

| | | | |
|---|---|---|---|
| 306,942 | 10/84 | Morse | 52—127 |
| 1,052,960 | 2/13 | Rasmussen | 52—217 |
| 1,223,253 | 4/17 | Britton | 217—15 |
| 1,238,228 | 8/17 | Weil | 52—6 X |
| 1,375,420 | 4/21 | Schumacher | 52—67 |
| 1,917,824 | 7/33 | Burns | 296—23 |
| 2,293,569 | 8/42 | Sonino | 52—71 |
| 2,520,277 | 8/50 | Eoord | 217—12 |
| 2,578,644 | 12/51 | Mautner | 220—97 X |
| 2,579,655 | 12/51 | Donald | 220—97 X |
| 2,591,049 | 4/52 | Butsch | 214—10.5 |
| 2,604,060 | 7/52 | Hansen | 52—643 |
| 2,661,110 | 12/53 | Allavena | 217—12 |
| 2,701,038 | 2/55 | Mooney | 52—69 |
| 2,712,677 | 7/55 | Hyde | 52—66 |
| 2,747,748 | 5/56 | Barefoot | 211—126 |
| 2,791,325 | 5/57 | Schecter et al. | 214—10.5 |
| 2,944,852 | 7/60 | Snyder | 52—67 |
| 3,023,463 | 3/62 | Bigelow | 52—262 |
| 3,075,252 | 1/63 | King | 52—29 |

FOREIGN PATENTS

| | | |
|---|---|---|
| 1,028,045 | 2/53 | France. |
| 1,178,632 | 12/58 | France. |
| 1,180,737 | 1/59 | France. |

FRANK L. ABBOTT, *Primary Examiner.*

JACOB L. NACKENOFF, *Examiner.*